3,165,926
CONTROL CIRCUIT FOR SPRING TESTERS
AND THE LIKE
Robert F. Orr and Kenneth F. Wetzel, both of Toledo, Ohio, assignors to Toledo Scale Corporation, Toledo, Ohio, a corporation of Ohio
Filed June 29, 1961, Ser. No. 126,774
9 Claims. (Cl. 73—161)

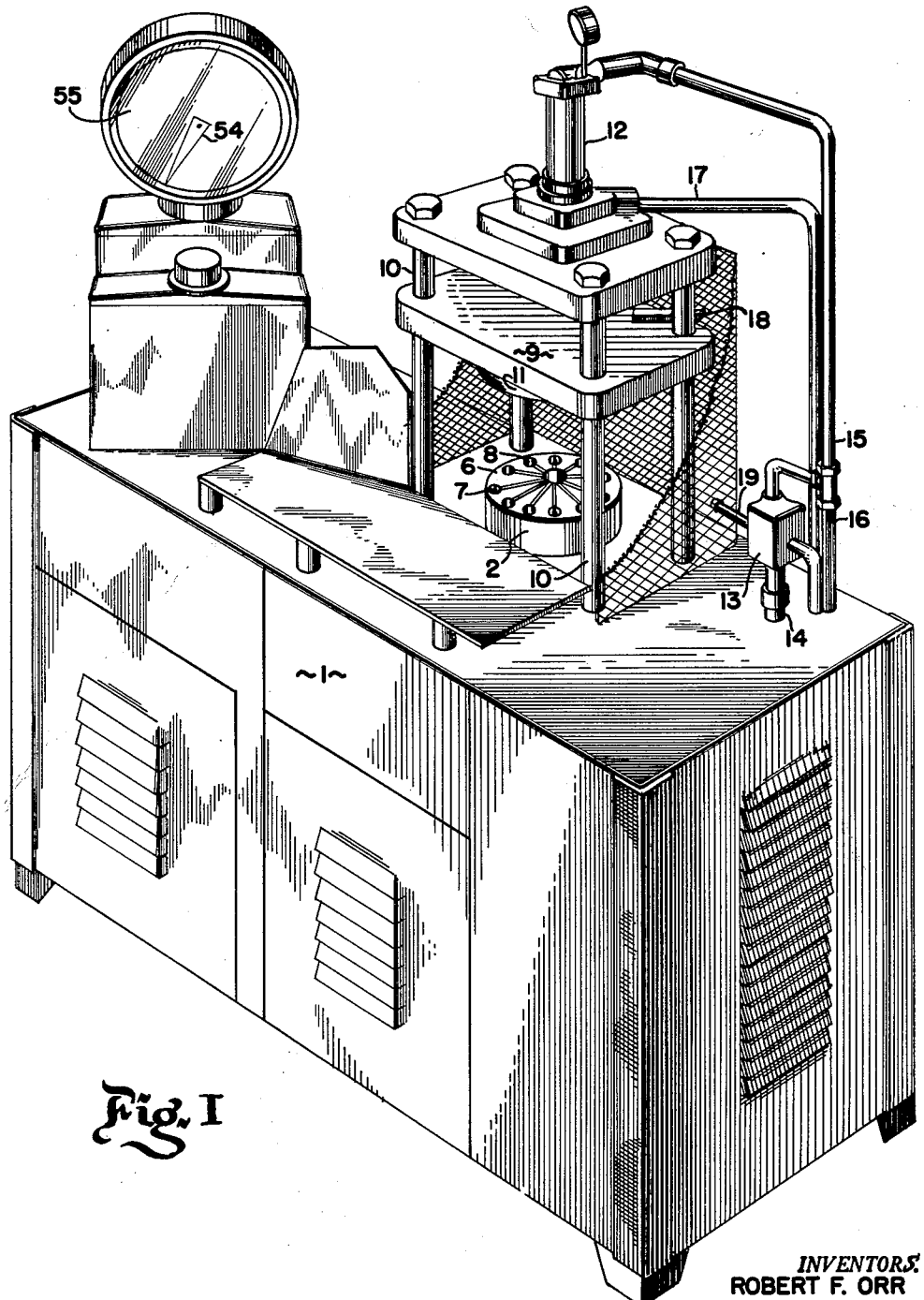

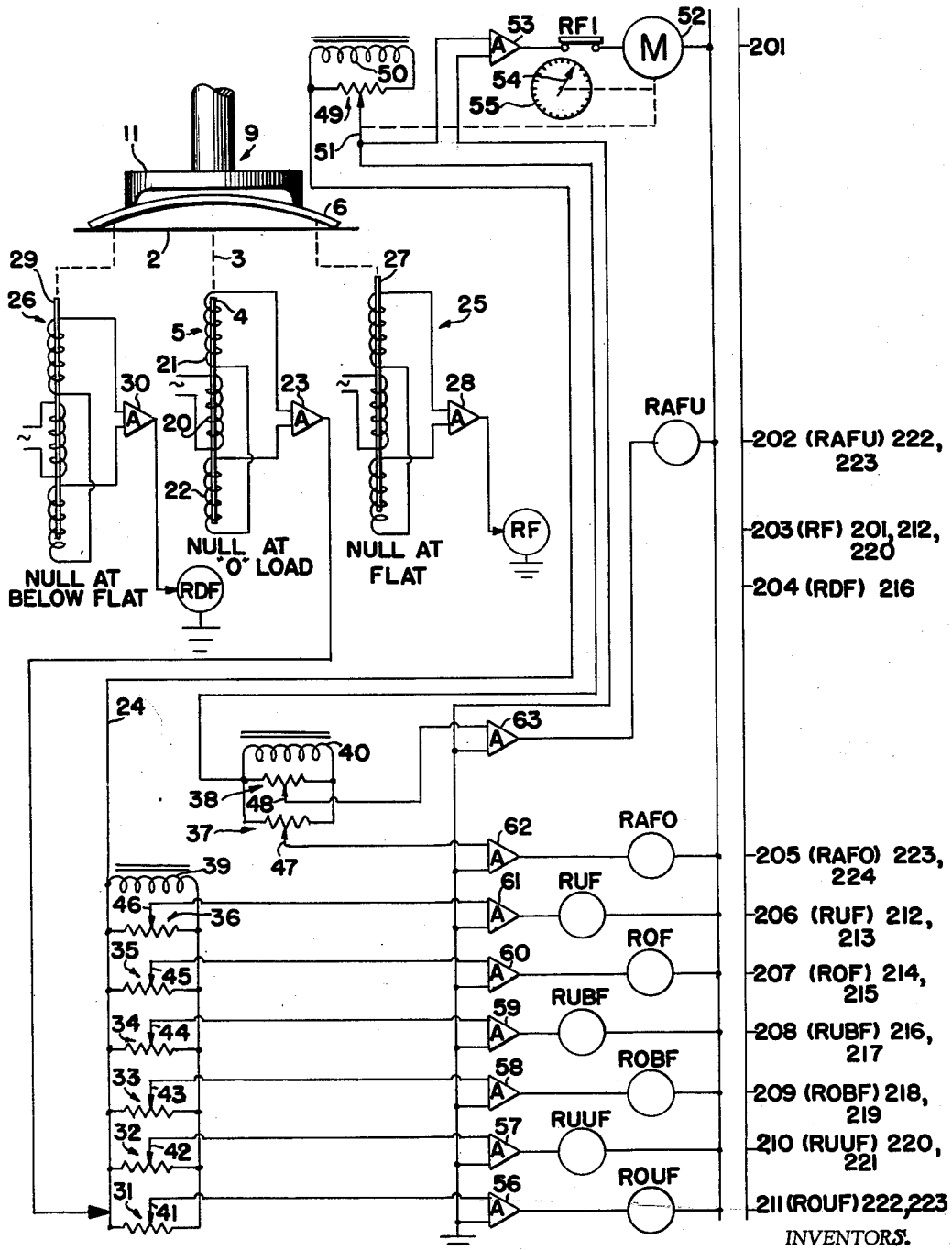
Fig. II

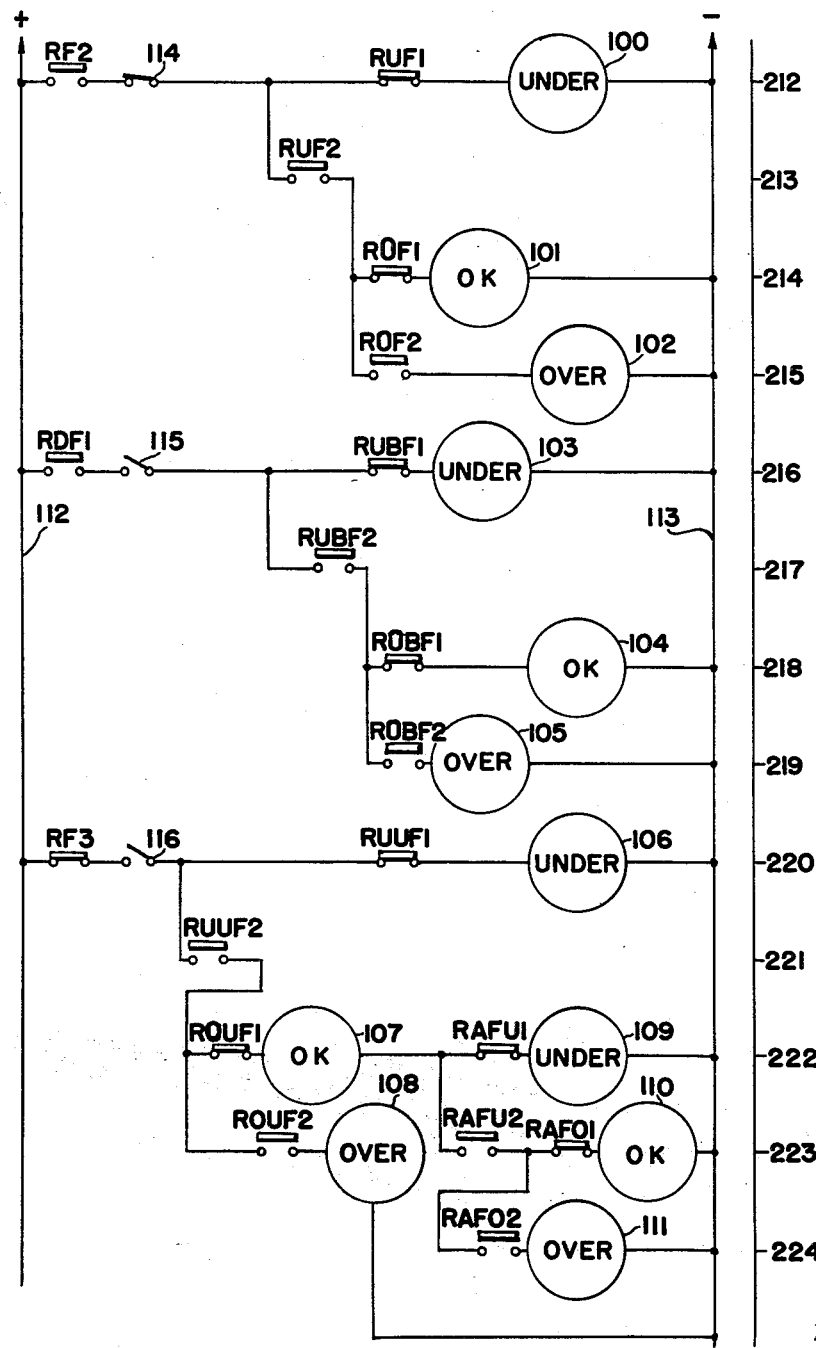
Fig. III
INVENTORS.
ROBERT F. ORR
KENNETH F. WETZEL
BY
Marshall & Wilson
ATTORNEYS

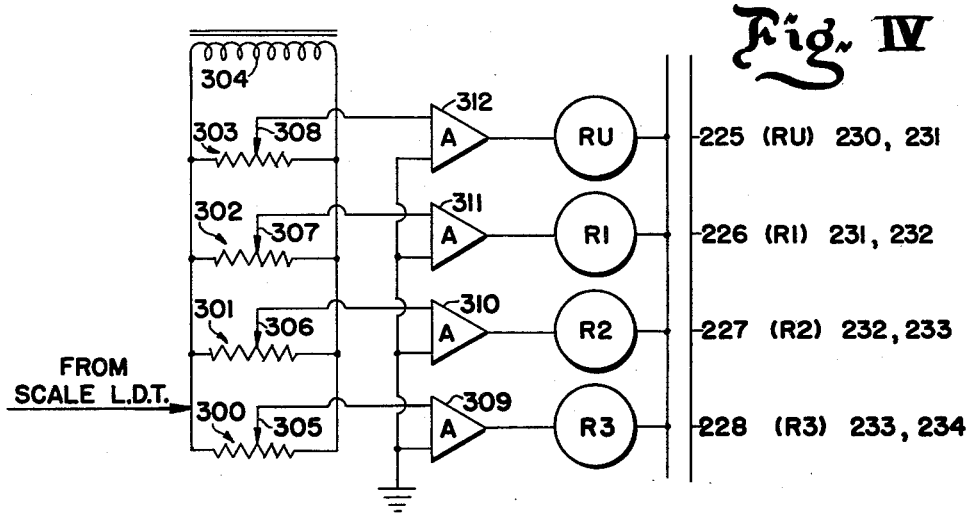
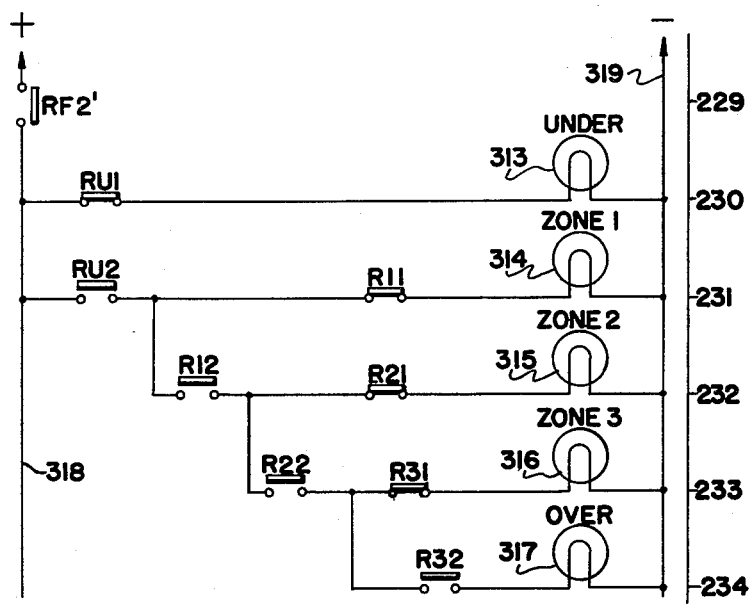

This invention relates to testing machines and more particularly to devices for testing the flexibility or the stiffness of springs.

The testing machines are particularly well suited for production testing where it is desired to determine quickly and accurately the forces presented by springs compressed or stretched to various positions for the purposes of uncovering hidden defects and to make apparent characteristics of usable springs, so that defective springs can be rejected and springs with similar characteristics can be arranged in sets.

Heretofore, spring testers have included rams for applying forces to the springs being tested which either deformed the springs to mechanical stops or deformed the springs until limit switches were tripped the locations of which switches controlled the lengths of the strokes of the rams. Such prior spring testers are generally unsatisfactory because the stopping of the rams at the test points makes repeatability of test results difficult, slows down the process, produces wear and tear on machine parts, requires frequent adjustments, and makes difficult if not impossible testing at several deformation points. Further, in the past no means has been provided for storing a force reading taken at a particular test position after the ram has traveled in one direction and for adding to that force reading a second force reading taken at the same test position after the ram has traveled in the opposite direction to in effect average the two readings.

Accordingly, the objects of this invention are to improve spring testing devices, to increase the precision of such devices, to increase the operating speed of such devices, to simplify the construction of such devices, to test springs while the rams in such devices are in motion, to test springs at several deformation points in such devices, to average force readings taken at the same particular test position in such devices, and to readily adapt such devices for determining either whether or not test springs are within tolerance and if not on which side (over or under) of the tolerance they are or for making such determination plus classifying the test springs into a plurality of zones within such tolerance.

One embodiment of this invention enabling the realization of these objects is a spring tester incorporating circuitry by means of which forces presented by springs at several test points are measured rapidly while the ram of the spring tester is in motion, i.e., weighing on the fly. The circuitry includes electrical probes which generate signals when the test springs are deformed to their test positions, a transducer which generates signals proportional to the forces presented by the test springs, and adjustable voltage sources defining acceptable test spring force tolerances. The signal from the transducer is compared continuously to the output voltages of the adjustable voltage sources and whenever a signal is received from a probe indicating that the test spring is deformed to a predetermined position a check on such comparison is made to determine whether or not the test spring is within tolerance and if not on which side (over or under) of the tolerance it is. In a modification, the check on such comparison is made to determine whether or not the test spring is within tolerance and if not on which side (over or under) of the tolerance it is and also to classify the test spring into one of a plurality of zones within such tolerance.

The circuitry also includes servo means for storing a force reading taken at a predetermined test position while the ram is traveling in one direction and means for adding to such force reading a second force reading taken at the same test position while the ram is traveling in the other direction for the purpose of in effect averaging the two readings. The averaged reading is compared to the output voltages of the adjustable voltage sources and a check on such comparison is made as described above to determine whether or not the test spring is within tolerance.

In accordance with the above, one feature of this invention resides in weighing on the fly, i.e., measuring the forces presented by the test springs while the ram is in motion. This makes possible the elimination of the mechanical stops used to define the test position in some prior spring testers and the limit switches used to control the lengths of the strokes of the rams defining the test position in other prior spring testers. Stopping of the rams at the test points in the prior spring testers makes repeatability of test results difficult, slows down the process, produces wear and tear on machine parts, requires frequent adjustments, and makes difficult if not impossible testing at several deformation points. Weighing on the fly according to the invention permits force measurements to be made readily at a plurality of test positions. In the prior machines using stops, force measurements could not readily be made at a plurality of test positions because stops have to be removed to permit the rams to proceed to additional test positions. It complicates the prior mechanism to provide for the removal and replacement of stops, such removal and replacement are time consuming, and it is nearly impossible to replace such stops in the exact positions from which they were removed.

There are several advantages in being able to make force measurements readily at a plurality of test positions. First, in present-day practice it is common for the users of springs to specify that such springs must be in tolerance at several test points. Second, some users of springs specify that the forces presented by the springs at a particular test point taken after the springs have been deformed in one direction be averaged with the forces presented by the springs at the same test point taken after the springs have been deformed in the reverse direction. Third, some springs have peculiar load vs. deflection curves which change from negative to positive slopes at points determined by such factors as heat treating and spring materials which points are of interest to the users of some springs and which can readily be determined by the spring testers of the invention. Fourth, some users of springs are interested in spring rates. In using the spring testers of the invention in which force measurements are made readily at a plurality of test positions, the force measurement at one given spring length and the force measurement at a second given length can be fed to an analog computer to calculate spring rate at high speed, spring rate being defined as:

$$\frac{f_1-f_2 \text{ pounds}}{d_1-d_2 \text{ inches}}$$

Another feature resides in providing circuitry which is easily modified to change the spring tester from a machine for determining whether or not test springs are within tolerance and if not on which side of the tolerance they are to a machine for making such determination plus classifying the test springs into a plurality of zones within such tolerance.

Still another feature resides in averaging force readings taken at the same test point but while the ram is traveling in opposite directions. Such force readings are not the same and such averaged readings increase the usefulness of the spring tester of the invention because it has been found that such averaged readings help in uncovering hidden defects and in making apparent characteristics of usable springs. It was not easy in the past to make a plurality of force measurements at the same or different test points and in the past no means has been provided for storing a force reading taken at a particular test point after the ram has traveled in one direction and for adding to that force reading a second force reading taken at the same test position after the ram has traveled in the opposite direction to in effect average the two readings taken at the same particular test position as done and is provided in the spring tester of the invention.

The above and other objects and features of this invention will be appreciated more fully from the following detailed description when read with reference to the accompanying drawings wherein:

FIG. I is a perspective view of a spring tester according to this invention showing a clutch spring in place ready to be tested;

FIG. II is a schematic wiring diagram showing circuitry for testing on the fly;

FIG. III is a schematic wiring diagram which in conjunction with the circuitry shown in FIG. II functions to determine whether or not test springs are within certain tolerances and if not on which sides (over or under) of the tolerances they are;

FIG. IV is a schematic wiring diagram of a modification for testing on the fly; and FIG. V is a schematic wiring diagram which in conjunction with the circuitry shown in FIG. IV functions to determine whether or not test springs are within tolerance and if not on which side (over or under) of the tolerance they are and in addition classifies the test springs into a plurality of zones within such tolerance.

Referring to the drawings, in FIG. I a spring tester as contemplated in this invention includes a cabinet 1 containing an ordinary weighing scale comprising a load receiving platform 2 (FIGS. I and II) so connected by mechanical linkage 3 to the armature 4 of a linear differential transformer 5 that the armature is axially movable in response to movements of the platform 2 under changes in loads thereon. Examples of weighing scales wherein linear differential transformers have their movable parts driven by weighing scale mechanism are disclosed in U.S. Patent No. 2,918,246, issued on December 22, 1959, to R. E. Bell, and in U.S. Patent No. 2,960,925, issued November 22, 1960, to R. O. Bradley. The structures of the linear differential transformers shown and described in the above patents are similar to the structure of the linear differential transformer 5. The armatures of the differential transformers shown and described in the above patents and the armature 4 of the differential transformer 5 are so positioned that, when there is no load upon the scales, there are no outputs from the transformers, i.e., the output voltage of the transformer 5 is zero at zero load or as indicated in FIG. II "NULL AT 0 LOAD."

A clutch spring 6 (FIGS. I and II) to be tested and classified is loaded by hand onto the platform 2, pins 7 on the platform being received by openings 8 defined by the spring 6 to locate the spring in centered position. A hydraulically-operated ram 9 reciprocably mounted on stationary guide rods 10 atop the cabinet 1 functions to compress the test spring 6 from its naturally upwardly arched or convex position shown in FIGS. I and II through a flat position to a below-flat or concave position, the ram 9 having a relatively small lower end 11 which contacts the spring 6 and deforms it.

The ram 9 is driven up and down by means of a hydraulic cylinder 12 having its piston (not shown) connected to the ram 9. One of the features of the spring tester is making measurements of the forces presented by the test spring 6 at several test points while the ram 9 is in motion, i.e., weighing on the fly. In order that such measurements can be made with precision and yet have a high speed operation, the ram 9 is driven slowly while such measurements are made and rapidly through the rest of its stroke. This is accomplished by means including a deceleration valve 13 and the hydraulic piping shown in FIG. I. The ram 9 is driven downwardly rapidly from its position shown in FIG. I under the influence of oil flowing from line 14 through the deceleration valve 13 to line 15 and from line 16 to line 15, the oil being supplied by line 15 to the upper end of the cylinder 12 and the oil being exhausted through line 17. The rapidly traveling ram 9 carries a cam 18 fixed to the ram downwardly, the cam 18 engaging a valve operator 19 of the deceleration valve 13 near the lower end of the ram's stroke and driving the valve operator 19 toward the deceleration valve 13 closing the valve. Oil flow then is through line 16 to line 15 causing the ram's speed to be reduced. The ram 9 continues to move downwardly slowly through the several test points and then is reversed by reversal of the points of oil supply and exhaustion to the cylinder 12, oil then being supplied by line 17 to the lower end of the cylinder 12 and the oil being exhausted through line 15 during upward movement of the ram 9. The ram 9 as it starts its upward movement continues to hold the cam 18 against the valve operator 19 keeping the deceleration valve 13 closed, oil being supplied to the bottom of the cylinder 12 through line 17 and exhausted from the top of the cylinder through lines 15 and 16. As soon as the upwardly moving cam 18 moves out of contact with the valve operator 19, the deceleration valve 13 opens and the oil is exhausted through lines 15 and 16 and through the deceleration valve 13 to line 14 causing the speed of the ram 9 to increase. The cam 18 holds the deceleration valve 13 closed during the time that the test spring 6 is deformed to its several test positions during upward and downward movements of the ram 9. Hence, during a complete cycle, the ram 9 is driven from its position shown in FIG. I downwardly rapidly until the cam 18 closes the valve 13 and then downwardly slowly through the test points until it is reversed and then moves upwardly slowly until the cam 18 moves out of contact with the valve operator 19 and then upwardly rapidly back to its home position. Except for the momentary stop at the point of reversal of the stroke, the ram 9 does not stop during the cycle, weighing being accomplished on the fly.

The linear differential transformer 5 also includes a centrally disposed exciting coil or primary 20 in circuit with a source of alternating current and opposed, series-connected secondary coils 21 and 22 leading to an amplifier 23 connected to a lead 24. Whenever the ram 9 moves, the armature 4 is moved effecting the magnetic unbalance of the transformer 5 in one sense and producing an A.C. signal output delivered as an input to the amplifier 23. This small A.C. signal is then amplified and applied to the lead 24. As the output of the secondaries is in amplitude a function of the degree of unbalance, the output voltage signal from the amplifier 23 increases as the ram 9 moves downwardly and returns to zero when the ram returns to its home position. Hence, the amplitude of the voltage applied by the amplifier 23 to the lead 24 is proportional to the load upon the weighing scale platform 2, i.e., is proportional to or a function of the force presented by the deformed test spring 6. Any suitable transducer can be substituted for the linear differential transformer 5 as long as the transducer functions to detect load upon the weighing scale platform 2.

Probes 25 and 26 are provided for signaling when the test springs are deformed to their test positions, the probes 25 and 26 each being a linear differential transformer alike in structure to the transformer 5 above described.

The armature 27 of transformer probe 25 is driven by the test spring 6 and effects a balance of the transformer probe 25 when the test spring is deformed by the ram 9 to a flat position, i.e., the voltage output from the transformer probe 25 to an amplifier 28 is zero whenever the test spring 6 is in its flat test position. The flat position of the test spring 6 is reached twice, i.e., while the ram 9 is moving downwardly and upwardly. Accordingly, the absence of a signal from the transformer probe 25 indicates the flat position of the test spring, i.e, "NULL AT FLAT" as indicated in FIG. II. When the signal from the transformer probe 25 goes through null and reverses phase, normally deenergized relay RF is operated by the amplifier 28 which is a phase sensitive amplifier. Accordingly, relay RF operates at the flat position of the test spring 6 and functions to signal control equipment, hereinafter described, that the test spring is at the flat position and, therefore, measuring of the force presented by the test spring, i.e., weighing, should start. The relays and all other circuit elements are shown in cross-the-line diagrams. The relay contacts, therefore, are often located remote from their actuating coils. In order to correlate the locations of the actuating coils and contacts, a marginal key has been employed with the circuit diagrams. With this key, the diagrams have been divided into horizontal bands which are identified with line numbers in the right hand margins. Relay symbols are located in the margins to the right of the line numerals and in horizontal alignment with the coil positions. The location of each contact actuated by a relay coil is set forth to the right of the relay symbol by the number of the line in which it appears. Thus, relay RF appearing in line 203 (FIG. II) has normally closed contacts RF1 and RF3 in lines 201 (FIG. II) and 220 (FIG. III), respectively, and normally open contact RF2 in line 212 (FIG. III).

The armature 29 of the transformer probe 26 is driven by the test spring 6 and effects a balance of the transformer probe 26 when the test spring is deformed by the ram 9 to a below flat or concave position (.080 inch below flat used for the clutch spring 6 in actual production line testing), i.e., the voltage output from the transformer probe 26 to a phase amplifier 30 is zero whenever the test spring 6 is in its predetermined, below flat test position. Accordingly, the absence of a signal from the transformer probe 26 indicates the below flat position of the test spring, i.e., "NULL AT BELOW FLAT" as indicated in FIG. II. When the signal from the transformer probe 26 goes through null and reverses phase, normally deenergized relay RDF is operated by the amplifier 30. Accordingly, relay RDF, which has normally open contact RDF1 in line 216 (FIG. III), operates at the below flat position of the test spring 6 and functions to signal the control equipment that the test spring is at the below flat position and, therefore, measuring of the force presented by the spring, i.e., weighing should start. The armatures or cores 27 and 29 are shown linked to the test spring 6. In actual practice, the cores each carry a small plunger which projects through a hole in the bottom of the platform 2, the cores being so adjusted by trial and error that probe 25 is at its null position when the clutch spring has been compressed to the flat position and the probe 26 is at its null position when the clutch spring has been compressed to the predetermined below flat position.

Accordingly, the probes 25 and 26 generate signals when the test springs are deformed to their test positions and the linear differential transformer 5 generates signals proportional to the forces presented by the test springs. The amplified signal from the scale transformer 5 is compared continuously to the output voltages of six adjustable voltage sources or tolerance potentiometers 31, 32, 33, 34, 35 and 36 and to the output voltages of two adjustable voltage sources or tolerance potentiometers 37 and 38 to which potentiometer 37 and 38 voltages an additional voltage is added as hereinafter described and whenever a signal is received from a probe 25 or 26 indicating that the test spring is deformed to a predetermined position a check on such comparison is made to determine whether or not the test spring is within tolerance and if not on which side (over or under) the tolerance is.

The potentiometers 31–36, which are energized by secondary windings 39 of a power transformer, and potentiometers 37 and 38, which are energized by secondary windings 40 of the power transformer, are provided with manually adjustable sliding contacts 41, 42, 43, 44, 45, 46, 47 and 48, respectively. The eight sliding contacts 41–48 are force selectors which are used to define four zones of force tolerance, namely, down flat, below flat, up flat, and down flat added to up flat. Voltages are developed across the potentiometers 31–38 which are out of phase with the output voltage from the scale amplifier 23, i.e., the output voltages from the potentiometers 31–38 oppose the output voltage from the amplifier 23.

The output voltage from the amplifier 23 also opposes the output voltage from a storage potentiometer 49, energized by secondary windings 50 of the power transformer and provided with a sliding contact 51 driven by a servomotor 52, to determine the flow of current through a servo amplifier 53. The amplified signal from the servo amplifier 53 is applied to the servo motor 52 which runs in the proper predetermined direction until the output from the servo amplifier 53 is reduced to zero. That is, an unbalance of output voltages from the weighing scale amplifier 23 and the potentiometer 49 results in operation of the servo motor 52 to position the contact 51 until the opposing voltages are equal whereby input voltage to the servo amplifier 53 is reduced to zero. As the ram 9 starts its stroke, the output voltage from the scale amplifier 23 increases in amplitude from zero and the servo motor 52 positions the contact 51 keeping the opposing voltages equal. When the ram 9 returns to its home position, the output from the scale amplifier 23 is reduced to zero and the contact 51 is returned to its home position. Accordingly, the position of the contact 51 in so far as the system has been described is indicative of the load upon the weighing scale, i.e., the forces presented by the test springs. The output voltage from the potentiometer 49 is in phase with and is added to each of the output voltages from the potentiometers 37 and 38, the sliding contact 51 being in circuit with such potentiometers. The servo motor 52 also positions an indicator 54 which points to indicia on an indicia-bearing chart 55 indicating the load upon the weighing scale.

The sliding contacts 41–48 are calibrated in pounds and are set by hand to define the four zones of force tolerances. Contacts 41 and 42 are set to define the up flat zone of force tolerance, i.e., the acceptable force presented by the test spring when it is deformed to its flat position by the ram 9 traveling upwardly. Contact 41 of potentiometer 31 is so set that the output voltage (proportional to the load upon the scale) from the scale amplifier 23 counterbalances the output voltage from the potentiometer 31 when the force presented by the test spring deformed, by the ram 9 traveling upwardly, to its flat poistion is over by a small increment the force desired. Contact 42 of potentiometer 32 is so set that the output voltage from the scale amplifier 23 counterbalances the output voltage from the potentiometer 32 when the force presented by the test spring deformed, by the ram 9 traveling upwardly, to its flat position is under by a small increment the force desired. Hence, contact 41 is set to define the upper limit and contact 42 is set to define the lower limit of the up flat zone. In a similar manner, contacts 43 and 44 are set to define the upper and lower limits, respectively, of the below flat zone, i.e., the acceptable force presented by the test spring when it is deformed to its below flat or concave position, and contacts 45 and 46 are set to define the upper and lower limits, respectively, of the down flat zone, i.e., the acceptable force presented by the test spring when it is deformed to its flat poistion by the ram 9 traveling downwardly.

The forces presented by the test spring in its down and up flat positions are not the same and modern testing practice often requires that such forces be averaged as another check on the acceptability and the classification of the spring. In the past, no means has been provided for automatically storing a force reading taken at the down flat position and automatically adding to such reading a force reading taken at the up flat position to in effect average the two readings. This is accomplished in the spring tester of the invention by the storage potentiometer 49 and the servo means including the servo motor 52 and amplifier 53. As hereinbefore described, as soon as the ram 9 starts down, the output voltage from the scale amplifier 23 increases in amplitude from zero and the servo motor 52 positions the contact 51 of storage potentiometer 49 keeping the opposing voltages equal. Accordingly, when the test spring is compressed to its down flat position, the output voltage of the storage potentiometer is equal to the output voltage of the scale amplifier 23 and at this point in the cycle relay RF is energized as above described and opens its normally closed contact RF1 in line 201. Opening of contact RF1 paralyzes the servo motor 52 which stops and holds the contact 51 storing the output voltage on the storage potentiometer 49. This stored voltage, which is proportional to the force presented by the test spring in its down flat position, is added to the output voltages of potentiometers 37 and 38 as above described. When the probe 25 again goes through null on the return stroke of the ram and again reverses phase, relay RF is operated again and it closes contact RF1 in line 201 and the servo motor 52 returns the potentiometer contact 51 to its home position as the ram 9 returns to its home position.

Contacts 47 and 48 of potentiometers 37 and 38, respectively, are set to define the down flat added to up flat or, in effect, average flat zone of force tolerance. Contact 47 is so set that the output voltage from the scale amplifier 23 counterbalances the output voltage from the potentiometer 37 plus the output voltage stored on the potentiometer 49 when the force presented by the test spring deformed, by the ram 9 traveling upwardly, to its flat position is over by a small increment the force desired. Hence, contact 47 is set to define the upper limit of the average flat zone. In a similar manner, contact 48 is set to define the lower limit of the average flat zone.

The tolerance potentiometers 31–38 are coupled to phase amplifiers 56, 57, 58, 59, 60, 61, 62, and 63, respectively, i.e., the outputs of the potentiometers are coupled to the phase amplifiers. Further, the outputs of the phase amplifiers 56–63 are coupled to relays ROUF (over up flat), RUUF (under up flat), ROBF (over below flat), RUBF (under below flat), ROF (over flat), RUF (under flat), RAFO (average flat over) and RAFU (average flat under), respectively, in lines 211, 210, 209, 208, 207, 206, 205 and 202, respectively. Relay ROUF has a normally closed contact ROUF1 in line 222 and a normally open contact ROUF2 in line 223, relay RUUF has a normally closed contact RUUF1 in line 220 and a normally open contact RUUF2 in line 221, relay ROBF has a normally closed contact ROBF1 in line 218 and a normally open contact ROBF2 in line 219, relay RUBF has a normally closed contact RUBF1 in line 216 and a normarly open contact RUBF2 in line 217, relay ROF has a normally closed contact ROF1 in line 214 and a normally open contact ROF2 in line 215, relay RUF has a normally closed contact RUF1 in line 212 and a normally open contact RUF2 in line 213, relay RAFO has a normally closed contact RAFO1 in line 223 and a normally open contact RAFO2 in line 224, and relay RAFU has a normally closed contact RAFU1 in line 222 and a normally open contact RAFU2 in line 223. As above described, voltages are developed across the potentiometers 31–38 which are out of phase with the output voltage from the scale amplifier 23, i.e., the output voltages of the potentiometers 31–38 oppose the output voltage from the amplifier 23. Hence, the instant the amplified output voltage from the scale linear differential transformer 5 is the same in amplitude as the output voltage from one of the potentiometers 31–38 a phase reversal occurs. As the amplitude of the output voltage from the scale amplifier increases from zero and then returns to zero during the down and up stroke of the ram 9, such phase reversal occurs at each of the potentiometers 31–38. When the signals from the potentiometers 31–38 go through null and reverse phase, normally deenergized relays ROUF, RUUF, ROBF, RUBF, ROF, RUF, RAFO and RAFU are operated by the phase sensitive amplifiers 56–63 coupled to the potentiometers 31–38.

In operation, the probes 25 and 26 generate signals when the test springs are deformed to their test positions and the linear differential transformer 5 generates signals proportional to the forces presented by the test springs. The amplified signal from the scale transformer 5 is compared continuously to the output voltages of the potentiometers 31–36 and to the output voltages of the potentiometers 37 and 38 to which potentiometer 37 and 38 voltages the stored voltage from the storage potentiometer 49 is added and whenever a signal is received from a probe 25 or 26 a check on such comparison is made to determine whether or not the test spring is within tolerance and if not on which side (over or under) the tolerance it is. Relays 100–111 (FIG. III) read out the check on such comparison and can be pictured for the sake of simplicity as indicating lights showing the four zones of force tolerances. The relays 100–111 are supplied with current flowing in supply lead 112 whenever the various relay contacts shown in FIG. III and stepping switch contacts 114, 115 and 116 also shown in FIG. III complete circuits to the read out relays, current flowing through the relay coils to a return lead 113. The stepping switch contacts can be pictured for the sake of simplicity as manually operated contacts in a control circuit, contact 114 being closed and contacts 115 and 116 being open at the start of a cycle, contact 115 being closed and contact 114 being opened if and when the operator sees that O.K. relay or light 101 has operated (contact 116 being left open), and contact 116 being closed and contact 115 being opened if and when the operator sees that O.K. relay or light 104 has operated (contact 114 being left open). In actual practice, operation of O.K. relays 101 and 104 causes a stepping switch to automatically operate the stepping switch contacts 114–116 while failure of O.K. relays 101 and 104 to operate causes the stepping switch to return to its home position with its contacts 114–116 positioned as shown in FIG. III and the ram 9 to reverse and return to its home position.

At the start of a cycle, the circuit elements in FIG. III are positioned as shown. At the down flat position of the test spring 6 normally deenergized relay RF is energized closing contact RF2 in line 212 to check the comparison of the output voltage from the scale amplifier 23 with the output voltages from the tolerance potentiometers 35 and 36. As soon as contact RF2 closes, one of the three relays 100–102 is energized indicating that the test spring is "UNDER" or "OK" or "OVER" in the down flat zone. If relay RUF (line 206) has not been operated at the time the check is made, i.e., when relay RF is operated, that means that the output voltage from the scale amplifier 23 is insufficient to counterbalance the output voltage from the tolerance potentiometer 36, i.e., the force presented by the test spring at the down flat position is under the lower limit of the down flat force tolerance zone, and current flows through closed contacts RF2, 114 and RUF1 to energize the coil of "UNDER" relay 100. If relay RUF (line 206) has been operated at the time the check is made, i.e., when relay RF is operated, that means that the force presented by the test spring at the down flat position is above the lower limit of the down flat force tolerance zone. Operation of relay RUF opens contact RUF1 (line 212) and closes contact RUF2 (line 213). If relay ROF (line 207) has not been operated at the time the check is made, i.e., when relay RF is operated, that means that the force presented by the test spring at the down flat position is below the upper limit of the down flat force tolerance zone (operation of relay RUF indicated that the force is above the lower limit). Since the force is below the upper limit and above the lower limit, it is within the zone. Current flows through closed contacts RUF2 and ROF1 to energize the coil of "OK" relay 101. If relay ROF has been operated at the time the check is made, i.e., when relay RF is operated, that means that the force presented by the test spring at the down flat position is above the upper limit of the down flat force tolerance zone. Operation of relay ROF opens contact ROF1 (line 214) and closes contact ROF2 (line 215). Current flows through closed contacts RUF2 and ROF2 to energize the coil of "OVER" relay 102. Hence, at the down flat position of the test spring 6, either "UNDER" relay 100 or "O.K." relay 101 or "OVER" relay 102 is operated to determine whether or not the test spring is within tolerance in the down flat zone and if not on which side (over or under) of the tolerance it is. One of the features of the spring tester is making this determination while the ram 9 is in motion, i.e., weighing on the fly. The instant the ram 9 compresses the test spring to its down flat position, contacts RF2 (line 212) close and one or the other of the relays 100–102 operates indicating the determination while the ram continues in its down stroke.

If "UNDER" relay 100 or "OVER" relay 102 is operated, the ram 9 is returned to its home position and the test spring 6 is removed from the tester and rejected. If "OK" relay 101 is operated, the ram 9 continues in its down stroke while stepping switch contact 114 is opened and stepping switch contact 115 is closed. At the below flat position of the test spring normally deenergized relay RDF (line 204) is energized closing contact RDF1 in line 216 to check the comparison of the output voltage from the scale amplifier 23 with the output voltages from the tolerance potentiameters 33 and 34. As soon as contact RDF1 closes, one of the three relays 103–105 is energized indicating that the test spring is "UNDER" or "OK" or "OVER" in the below flat zone. Relays 103–105 are operated in a manner similar to the way in which relays 100–102 are operated as above described. If relay RUBF (line 208) has not been operated at the time relay RDF is operated, the force presented by the test spring at the below flat position is under the lower limit of the below flat force tolerance zone and current flows through closed contacts RDF1, 115 and RUBF1 to energize the coil of "UNDER" relay 103. If relay RUBF has been operated at the time relay RDF is operated, the force presented by the test spring at the below flat position is over the lower limit of the below flat force tolerance zone. Operation of relay RUBF opens contact RUBF1 (line 216) and closes contact RUBF2 (line 217). If relay ROBF (line 209) has not been operated at the time relay RDF is operated, the force presented by the test spring at the below flat position is below the upper limit of the below flat force tolerance zone. Current flows through closed contacts RUBF2 and ROBF1 to energize the coil of "OK" relay 104. If relay ROBF has been operated at the time relay RDF is operated, the force presented by the test spring at the below flat position is above the upper limit of the below flat force tolerance zone. Operation of relay ROBF opens contact ROBF1 (line 218) and closes contact ROBF2 (line 219). Current flows through closed contacts RUBF2 and ROBF2 to energize the coil of "OVER" relay 105. Hence, at the below flat position of the test spring, either "UNDER" relay 103 or "OK" relay 104 or "OVER" relay 105 is operated to determine whether or not the test spring is within tolerance in the below flat zone and if not on which side (over or under) of the tolerance it is. The instant the ram 9 compresses the test spring to its below flat position, contacts RDF1 (line 216) close and one or the other of the relays 103–105 operates indicating the determination, the ram then reversing and starting its up stroke.

If "UNDER" relay 103 or "OVER" relay 105 is operated, the ram 9 is returned to its home position and the test spring is removed from the tester and rejected. If "OK" relay 104 is operated, the ram 9 continues in its up stroke while stepping switch contact 115 is opened and stepping switch contact 116 is closed. At the up flat position of the test spring, the signal from the transformer probe 25 again goes through null and reverses phase causing normally deenergized relay RF (line 203) to be deenergized again. Deenergization of relay RF opens contact RF2 (line 212) and closes contact RF3 (line 220) to check the comparison of the output voltage from the scale amplifier 23 with the output voltages from the tolerance potentiometers 31 and 32. As soon as contact RF3 closes, one of the three relays 106–108 is energized indicating that the test spring is "UNDER" or "OK" or "OVER" in the up flat zone. Relays 106–108 are operated in a manner similar to the way in which relays 100–102 and 103–105 are operated as above described. If relay RUUF (line 210) has not been operated at the time relay RF is operated, current flows through closed contacts RF3, 116 and RUUF1 to energize the coil of "UNDER" relay 106. If relay RUUF has been operated at the time relay RF is operated, contact RUUF1 is open and contact RUUF2 is closed. If relay ROUF (line 211) has not been operated at the time relay RF is operated, current flows through closed contacts RUUF2 and ROUF1 to energize the coil of "OK" relay 107. If relay ROUF has been operated at the time relay RF is operated, contact ROUF1 is open and contact ROUF2 is closed. Current flows through closed contacts RUUF2 and ROUF2 to energize the coil of "OVER" relay 108. Hence, at the up flat position of the test spring, either "UNDER" relay 106 or "OK" relay 107 or "OVER" relay 108 is operated to determine whether or not the test spring is within tolerance in the up flat zone and if not on which side (over or under) of the tolerance it is. The instant the ram 9 permits the compressed spring to relax to its up flat test position, contacts RF3 (line 220) close and one or the other of the relays 106–108 operates indicating the determination, the ram continuing in its up or return stroke.

If "UNDER" relay 106 or "OVER" relay 108 is operated, the ram 9 is returned to its home position and the test spring is removed from the tester and rejected. If "OK" relay 107 is operated, current flows through the coil of the relay 107 to operate one or the other of relays 109–111 to check the comparison of the output voltage from the scale amplifier 23 with the output voltages from the tolerances potentiometers 37 and 38. As soon as the coil of "OK" relay 107 is energized, one of the three relays 109–111 is energized indicating that the test spring is "UNDER" or "OK" or "OVER" in the average flat zone. Relays 109–111 are operated in a manner similar to the way in which relays 100–102, 103–105, and 106–

108 are operated as above described. If relay RAFU (line 202) has not been operated at the time "OK" relay 107 is operated, current flows through closed contacts RAFU1 to energize the coil of "UNDER" relay 109. If relay RAFU has been operated at the time "OK" relay 107 is operated, contact RAFU1 is open and contact RAFU2 is closed. If relay RAFO (line 205) has not been operated at the time "OK" relay 107 is operated, current flows through closed contacts RAFU2 and RAFO1 to energize the coil of "OK" relay 110. If relay RAFO has been operated at the time "OK" relay 107 is operated, contact RAFO1 is open and contact RAFO2 is closed. Current flows through closed contacts RAFU2 and RAFO2 to energize the coil of "OVER" relay 111. Hence, either "UNDER" relay 109 or "OK" relay 110 or "OVER" relay 111 is operated to determine whether or not the test spring is within tolerance in the average flat zone and if not on which side (over or under) of the tolerance it is. Operation of the four "OK" relays 101, 104, 107, and 110 during the testing cycle indicates to the operator by the lighting four lights that the test spring is acceptable. The four readings, namely, down flat, below flat, up flat, and down flat added to up flat are made in a matter of seconds.

The above circuit means makes up a control circuit comprising first and second signal circuits, the first signal circuit, i.e., the scale linear differential transformer 5, providing a voltage proportional to a quantity to be measured and the second signal circuit, e.g., the probe 25, providing a signal signifying the quantity is ready to be measured, a reference circuit providing an adjustable preset reference voltage, e.g., provided by tolerance potentiometer 31, a signal comparing circuit for comparing the magnitudes of the proportional and preset reference voltages, e.g., the amplifier 56 and relay ROUF, and an output circuit (FIG. III) so connected to the second signal circuit and to the signal comparing circuit that it responds to the signal provided by the second signal circuit and provides an output signal condition in accordance with the comparison of the magnitudes of the proportional and reference voltages.

A modification of the circuitry shown in FIGS. II and III is shown in FIGS. IV and V. The circuitry shown in FIGS. II and III is used to determine whether or not the test spring is within tolerance (four tolerance zones) and if not on which side (over or under) of the tolerance it is. The circuitry shown in FIGS. IV and V is used to determine whether or not the test spring is within tolerance (only one tolerance zone for the sake of simplicity) and if not on which side (over or under) of the tolerance it is, and also to classify the test spring into one of a plurality of zones within such tolerance.

In the modification, the amplified signal from the scale linear differential transformer 5 is compared continuously, as indicated by the arrow and legend in FIG. IV "FROM SCALE LDT," to the output voltages of four adjustable voltage sources or tolerance potentiometers 300–303, which are energized by secondary windings 304 of a power transformer, and whenever a signal is received from the linear differential transformer proble 25 indicating that the test spring is deformed to its down flat position a check on such comparison is made. The tolerance potentiometers 300–303 are provided with manually adjustable sliding contacts 305–308, respectively. The four sliding contacts 305–308 are force selectors that are used to define one zone of force tolerance and three sub-zones within such zone, namely, "UNDER," "ZONE 1," "ZONE 2," "ZONE 3," and "OVER," as indicated in FIG. V. Voltages are developed across the tolerance potentiometers 300–303 which are out of phase with the amplified signal from the scale linear differential transformer 5. Contact 305 of potentiometer 300 is so set that the amplified signal from the scale linear differential transformer 5 counterbalances the output voltage from the tolerance potentiometer 300 when the force presented by the test spring deformed, by the ram 9 traveling downwardly, to its flat position is over by a small increment the force desired. Hence, contact 305 is set to define the upper limit of the zone. In a similar manner, contact 308 is set to define the lower limit of the zone and contacts 306 and 307 are set to define three sub-zones within such zone.

The tolerance potentiometers 300–303 are coupled to phase amplifiers 309–312, respectively, i.e., the outputs of the potentiometers are coupled to the phase amplifiers. Further, the outputs of the phase amplifiers 309–312 are coupled to relays R3, R2, R1 and RU, respectively, in lines 228, 227, 226, and 225, respectively. Relay R3 has a normally closed contact R31 in line 233 and a normally open contact R32 in line 234, relay R2 has a normally closed contact R21 in line 232 and a normally open contact R22 in line 233, relay R1 has a normally closed contact R11 in line 231 and a normally open contact R12 in line 232, and relay RU has a normally closed contact RU1 in line 230 and a normally open contact RU2 in line 231. Contact RF2′ in line 229 is operated by relay RF (line 203) in the same manner as contact RF2 in line 212 is operated as hereinbefore described. The instant the amplified signal from the scale linear differential transformer 5 is the same in amplitude as the output voltage from one of the tolerance potentiometers 300–303 a phase reversal occurs. When the signals from the tolerance potentiometers 300–303 go through null and reverse phase, normally deenergized relays R3, R2, R1 and RU are operated by the phase sensitive amplifiers 309–312 coupled to the tolerance potentiometers 300–303.

In operation, the linear differential transformer probe 25 generates a signal when the test spring is deformed to its flat test position and the linear differential scale transformer 5 generates signals proportional to the forces presented by the test spring. The amplified signal from the scale transformer 5 is compared continuously to the output voltages of the tolerance potentiometers 300–303 and whenever a signal is received from the probe 25 a check on such comparison is made. Lights 313–317 (FIG. V) read out the check on such comparison. The lights 313–317 are supplied with current flowing in supply lead 318 whenever the various relay contacts shown in FIG. V complete circuits to the lights, current flowing through the lights to a return lead 319.

At the start of a cycle, the circuit elements in FIG. V are positioned as shown. At the down flat position of the test spring normally deenergized relay RF (line 203) is energized closing contact RF2′ (line 229) to check the comparison of the output voltage from the scale amplifier 23 with the output voltages from the tolerance potentiometers 300–303. As soon as contact RF2′ closes, one of the five lights 313–317 is lit indicating that the test spring is "UNDER" or "ZONE 1" or "ZONE 2" or "ZONE 3" or "OVER" in the down flat zone. Springs in "UNDER" or "OVER" are rejected by the operator. Springs in "ZONE 1" or "ZONE 2" or "ZONE 3" are put in groups according to their zone by the operator. Accordingly, accepted springs can be arranged in sets. When springs are employed in sets, it is often important that the resistance offered to a given degree of flexure or distortion be the same for each spring in the set.

If the relay RU (line 225) has not been operated at the time relay RF (line 203) is operated, that means that the output voltage from the scale amplifier 23 is insufficient to counterbalance the output voltage from the tolerance potentiometer 303, i.e., the force presented by the test spring at the down flat position is under the lower unit of the force tolerance zone, and current flows through closed contacts RF2′ and RU1 to light the "UNDER" light 313. If relay RU has been operated at the time relay RF is operated, that means that the force presented by the test spring at the down flat position is above the lower limit of the force tolerance zone. Operation of relay RU opens contact RU1 (line 230) and closes contact RU2 (line 231). If relay R1 (line 226) has not been operated when relay RF is operated, that means that the force presented by the test spring at the down flat position is below the upper limit of ZONE 1. Current flows through closed contacts RU2 and R11 to light the "ZONE 1" light 314. If relay R1 has been operated when relay RF is operated, that means that the force presented by the test spring at the down flat position is above the upper limit of ZONE 1. Operation of relay R1 opens contact R11 (line 231) and closes contact R12 (line 232). If relay R2 (line 227) has not been operated, that means that the force presented by the test spring at the down flat position is below the upper limit of ZONE 2. Current flows through closed contacts R12 and R21 to light the "ZONE 2" light 315. The "ZONE 3" light 316 is lit in a similar manner. If relay R2 has been operated, contacts R21 open and contact R22 close. If relay R3 has not been operated, current flows through closed contacts R22 and R31 to light the "ZONE 3" light 316. The "OVER" light 317 is lit in a similar manner. If relay R3 has been operated, contacts R31 open and contacts R32 close and current flows through closed contact R32 to light the "OVER" light 317.

The embodiments of the invention herein shown and described are to be regarded as illustrative only and it is to be understood that the invention is susceptible to variation, modification, and change within the spirit and scope of the subjoined claims.

Having described the invention, we claim:

1. A control circuit comprising, in combination, first and second signal circuits, the first signal circuit providing a voltage proportional to a quantity to be measured and the second signal circuit providing a signal signifying the quantity is ready to be measured, a reference circuit providing two adjustable preset reference voltages one defining the upper limit and the other defining the lower limit of a tolerance zone and both opposing the proportional voltage, a signal comparing circuit for comparing the magnitudes of the proportional voltage with the preset reference voltages, and an output circuit so connected to the second signal circuit and to the signal comparing circuit that it responds to the signal provided by the second signal circuit and provides an output signal condition in accordance with the comparison of the magnitudes of the proportional voltage with the preset reference voltages.

2. A control circuit comprising, in combination, first and second signal circuits, the first signal circuit providing a voltage proportional to a quantity to be measured and the second signal circuit providing first and second signals spaced in time signifying the quantity is ready to be measured twice, a reference circuit providing an adjustable preset reference voltage opposing the proportional voltage, an alterable voltage storage source connected to the reference circuit and supplying a voltage in opposition to the proportional voltage and in addition to the preset reference voltage, servo means responsive to differences between the proportional voltage and the voltage from the storage source for altering the voltage from the storage source to a level balancing the proportional voltage, the servo means stopping in response to the first signal for storing the voltage on the storage source and restarting in response to the second signal for again altering the voltage from the storage source to a level balancing the proportional voltage, a signal comparing circuit for comparing the magnitude of the proportional voltage with the magnitude of the combined preset reference voltage and the stored voltage, and an output circuit so connected to the second signal circuit, and to the signal comparing circuit that it responds to the second signal and provides an output signal condition in accordance with the comparison of the magnitudes of the proportional voltage with the magnitude of the combined preset reference voltage and the stored voltage.

3. A control circuit in accordance with claim 1 wherein the first signal circuit includes a linear differential transformer which provides said proportional voltage.

4. A control circuit in accordance with claim 1 wherein the second signal circuit includes a linear differential transformer which provides said signal signifying the quantity is ready to be measured.

5. In a spring tester having reciprocable means for deforming a test spring to a predetermined deflection point, in combination, first signal means providing a voltage proportional to the force presented by the deformed test spring, second signal means providing a deflection signal upon deformation of the test spring to the predetermined deflection point, means providing preset voltages defining an acceptable force tolerance zone corresponding to the predetermined deflection point, the proportional voltage opposing the preset voltages, signal comparing means for continuously comparing the magnitudes of the proportional and preset reference voltages, and circuit means, including under, OK and over elements, responsive to the deflection signal and so connected to the signal comparing circuit that one of the elements operates in response to the comparison of the magnitudes of the proportional voltage with the preset reference voltages.

6. In a spring tester in accordance with claim 5 wherein the first signal means includes a linear differential transformer which provides said proportional voltage.

7. In a spring tester in accordance with claim 5 wherein the second signal means includes a linear differential transformer which provides said deflection signal.

8. In a spring tester having reciprocable means for deforming a test spring to a predetermined deflection point, in combination, first signal means providing a voltage proportional to the force presented by the deformed test spring, second signal means providing a first deflection signal upon deformation of the test spring to the predetermined deflection point during movement of the reciprocable means in a first direction and providing a second deflection signal upon deformation of the test spring to the predetermined deflection point during movement of the reciprocable means in a return direction, reference means providing adjustable preset voltages, an alterable voltage storage source connected to the reference means supplying a voltage in opposition to the proportional voltage and in addition to the preset reference voltages, servo means responsive to differences between the proportional voltage and the voltage from the storage source for altering the voltage from the storage source to a level balancing the proportional voltage, the servo means stopping in response to the first deflection signal to store the voltage on the storage source and restarting in response to the second deflection signal for again altering the voltage from the storage source to a level balancing the proportional voltage, the adjustable preset voltages each combined with the stored voltage defining an acceptable force tolerance zone, the proportional voltage opposing and being compared continuously to the adjustable preset voltages each combined with the stored voltage, and means responsive to the second deflection signal for checking the voltage comparison during movement of the reciprocable means and indicating the force presented by the test spring when deformed to the predetermined deflection point during travel of the reciprocable means in the return direction relative to the acceptable force tolerance zone.

9. In a spring tester having reciprocable means for deforming a test spring to a predetermined deflection point, in combination, first signal means providing a voltage proportional to the force presented by the deformed test spring, second signal means providing first and second deflection signals upon deformation of the test spring to the predetermined deflection point during movement of the reciprocable means in first and return directions, respectively, reference means providing adjustable preset voltages, an alterable voltage storage source connected to the reference means supplying a voltage in opposition to the proportional voltage and in addition to the preset reference voltages, servo means responsive to differences between the proportional voltage and the voltage from the storage source for altering the voltage from the storage source to a level balancing the proportional voltage, the servo means being stopped in response to the first deflection signal for storing the voltage on the storage source and being restarted in response to the second deflection signal, the adjustable preset voltages each combined with the stored voltage defining an acceptable force tolerance zone, signal comparing means for continuously comparing the magnitudes of the proportional and the combined preset reference and stored voltages, and circuit means, including under, OK and over elements, responsive to the second deflection signal and so connected to the signal comparing circuit that one of the elements operates in response to the comparison of the magnitudes of the proportional and the combined preset reference and stored voltages.

References Cited in the file of this patent
UNITED STATES PATENTS 2,930,943     Ruge _____ Mar. 29, 1960